J. W. KINGSBURY.
King Bolt.
No. 95,488.
Patented Oct. 5, 1869.
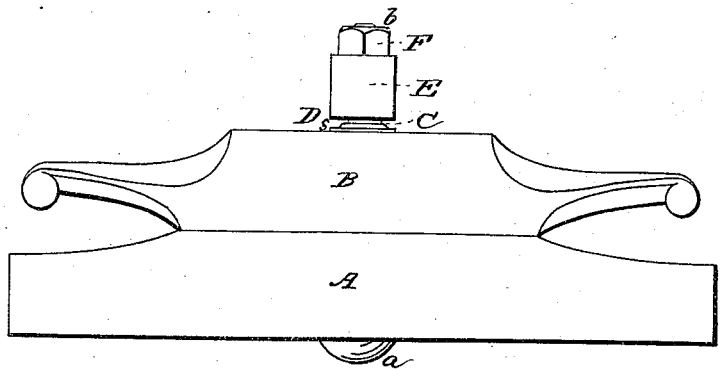
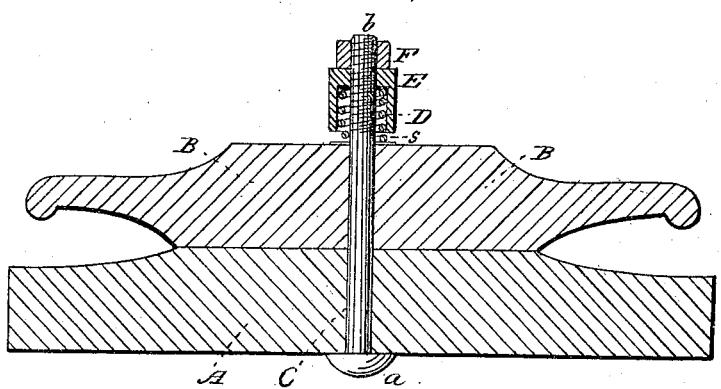
Witnesses
Inventor
John. W. Kingsbury
by his attorney

United States Patent Office.

JOHN W. KINGSBURY, OF NEW BEDFORD, MASSACHUSETTS.

Letters Patent No. 95,488, dated October 5, 1869.

IMPROVEMENT IN CARRIAGE-AXLE CONNECTION.

The Schedule referred to in these Letters Patent and making part of the same.

*To all persons to whom these presents may come:*

Be it known that I, JOHN W. KINGSBURY, of New Bedford, of the State of Massachusetts, have invented a new and useful Improvement in Carriage-Axle Connections; and I do hereby declare the same to be fully described in the following specification, and represented in the accompanying drawings, of which—

Figure 1 is a front elevation, and

Figure 2, a longitudinal section of a carriage-axle, spring-block, and king-bolt, as provided with my invention, the main purpose of which is to prevent rattle and noise of the contiguous parts, consequent on wear of the king-bolt and its nut while in use.

Another object of my invention is to prevent the leverage and lateral strain on the king-bolt from breaking it, whether in its shank or separating the head from the shank, or the nut therefrom, as occasionally takes place.

In the drawings—

A denotes the middle part of an axle.

B, the spring-block or bearing, on which the forward elliptical spring or the body of a carriage wholly rests.

The king-bolt, shown at C, passes up through the axle and the spring-block, and also through the spring, when resting on the block, and is provided, as usual, with a head, $a$, at its lower end, and a male screw, $b$, at the upper part of the shank.

Where the male screw projects above the spring or its block, it generally has had a nut screwed upon it, the upper end of the shank of the king-bolt subsequently being upset so as to keep the nut from accidentally working off the screw.

As soon as the surfaces in contact become more or less worn, they will play apart, and noise and other disagreeable or injurious consequences will follow.

In order to keep the axle and the spring-bolt in close contact, and to compensate for wear of their rubbing-surfaces and the king-bolt, I encompass the king-bolt, where it projects above the carriage-spring, or the block B thereof, with a helical spring, D, and also with a hollow cylindrical cap-nut, E, formed to receive the spring to encompass it, and screw on the screw $b$ of the king-bolt.

I also screw on the said screw, and against the top of the cap-nut, E, a check-nut, F.

While the cap-nut answers to enclose and hide most of the helical spring from view, it, with the check-nut, serves to regulate the tension of the spring, the cap-nut, while in use, not extending down upon the spring or the spring-block.

A space, $s$, is left between them, in order to enable any sudden lateral strain on the axle, to be borne by the spring and the head of the king-bolt, rather than by two inelastic bodies, as is commonly the case.

The danger of breakage of the king-bolt is greatly lessened by the use of the helical spring, in manner and with respect to it, and the axle, and spring-block, as specified.

I claim the arrangement of the helical spring D and its cap-nut E with the king-bolt C, its check-nut F, the axle A, and the spring-block B, as specified.

J. W. KINGSBURY.

Witnesses:
 R. H. EDDY,
 S. N. PIPER.